United States Patent [19]
Mabuchi

[11] 3,914,899
[45] Oct. 28, 1975

[54] MOTOR MOUNT
[75] Inventor: Kenichi Mabuchi, Tokyo, Japan
[73] Assignee: Mabuchi Motor Co., Ltd, Tokyo, Japan
[22] Filed: May 23, 1974
[21] Appl. No.: 472,679

[30] Foreign Application Priority Data
June 1, 1973 Japan.............................. 48-62139

[52] U.S. Cl. ................................ 46/243 AV; 46/78
[51] Int. Cl.² .......................................... A63H 29/22
[58] Field of Search............ 46/78, 243 AV; 310/51

[56] References Cited
UNITED STATES PATENTS
3,699,708  10/1972  Mabuchi ....................... 46/243 AV
3,777,420  12/1973  Bosley ............................ 46/243 AV Primary Examiner—Louis G. Mancene
Assistant Examiner—Robert F. Cutting

[57] ABSTRACT

A motor mount designed to support an electric motor at the center of gravity of the combination of the motor and the mount.

5 Claims, 2 Drawing Figures

MOTOR MOUNT

BACKGROUND OF THE INVENTION

1. Field of the Invention

This invention relates generally to a motor mount, and more specifically to a generally cylindrical motor mount fitting onto the motor casing, and having mounting members to support the motor mount and the motor at their combined center of gravity to prevent vibration.

2. Description of the prior art

A big problem presently existing in an electric motor driven model airplane is how to fix a heavy motor to the fuselage because a slight loosening of for instance, a fastening screw might cause unwanted vibration of the fuselage due to rotation of the motor.

Also, in designing the fuselage of a model airplane, the propeller is often mounted on an extension from the motor shaft to improve the fuselage styling. In such a case, how to support the extension shaft is another problem which has to be resolved.

SUMMARY OF THE INVENTION

The present invention is intended to solve aforementioned problems, and accordingly, an object of the present invention is to provide a motor mount which can support an electric motor at its center of gravity.

Another object of the present invention is to provide a motor mount which is designed to prevent unwanted vibration by providing means for supporting the motor and mount at their combined center of gravity.

It is a further object of the present invention to provide a motor mount which is designed to facilitate the support of an entire motor assembly at its center of gravity even when there is a slight error in dimensions of the motor, or a slight change in the load, such as a propeller, applied to the motor shaft.

A further object of the present invention is to provide a motor mount which is designed to ensure mechanical support for an extension shaft when needed.

It is a still further object of the present invention to provide a motor mount which is designed to prevent cooling holes provided through a motor case from being closed by the mount when the mount is fitted onto the motor case.

Figure 1:
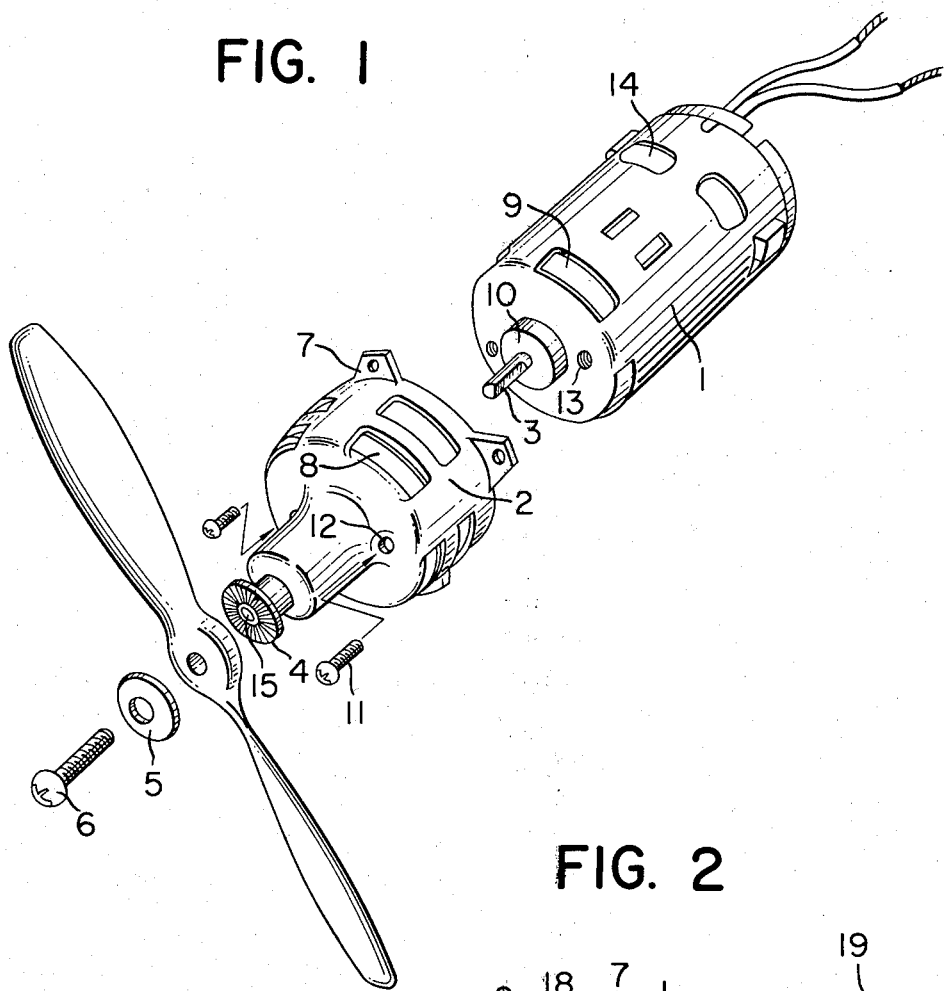
FIG. 1 is an exploded view of a motor and a motor mount embodying the present invention.

DETAILED DESCRIPTION OF THE EMBODIMENT:

Referring to the drawings, numeral 1 refers to a motor casing onto which a generally cylindrical cap mount 2 is fitted coaxially with a motor shaft 3 of the motor. A propeller 16 is fixed to a propeller or extension shaft 15 of the cap mount 2 by means of a propeller flange 4, a propeller washer 5 and a shaft screw 6.

Figure 2:
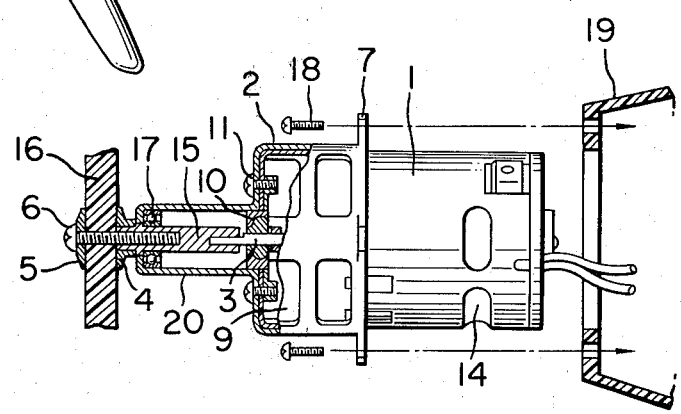
FIG. 2 is a partially cutaway side view of the motor and motor mount about to be fixed to a fuselage.

As clearly shown in FIG. 2, the motor shaft 3 is connected to the propeller shaft 15 inside the cap mount 2, the propeller shaft 15 being rotatably supported by means of a bearing 17 such as a ball bearing or oil impregnated metal bearing. Mounting members 7 are integrally provided on the cap mount 2. The cap mount 2 is fixed onto the motor case 1 by means of positioning screws 11 passing through fixing holes 12 and 13. A motor bearing 10 contacts the inner surface of the cap mount 2. The cap mount 2 fitted and fixed onto the motor case 1 in the abovementioned manner is further fixed firmly to a support structure or frame 19 of a model plane fuselage by means of screws 18 passing through the mounting members 7, as shown in FIG. 2. The position of the mounting members 7 is designed and adjusted so that the mounting members 7 are disposed at the center of gravity of the entire combination including the motor casing 1, the cap mount 2, the propeller shaft 15 and propeller 16.

Furthermore, in view of the fact that air cooling holes 9 and 14 are often provided through the motor case 1, proper consideration is made to prevent, for example, the motor cooling hole 9 from being closed by providing a cooling hole 8 through the cap mount 2 and aligning the cooling holes 8 and 9.

As described above, the supporting points of a motor mount embodying this invention are disposed on a plane transversely passing through the longitudinal center of gravity of the entire combination, so that a slight loosening of a screw does not affect directly the balance of the entire model plane, and unwanted vibration of the fuselage can be prevented.

Since the cap mount 2 having the mounting members 7 is designed to axially fit onto the motor casing 1, it is easy to adjust the mounting members 7 to be positioned in the plane through the center of gravity of the entire combination by providing a clearance, washers, etc., between the axial mating surfaces of the casing 1 and mount 2.

In addition, the position of the main wing of model a plane is usually designed so that the center of gravity of a heavy motor assembly falls beneath the main wing, but if the propeller 16 is fixed directly to the motor shaft 3, the main wing comes too close to the propeller 16, thus the styling of the overall model plane and the maneuverability are degraded. Meanwhile, the motor shaft 3 is often designed to have as small a diameter as possible to reduce mechanical friction. However, if the propeller 16 is directly connected to the motor shaft 3, rotation of the motor shaft 3 might be affected by bending caused by external impact. For these reasons, the motor shaft 3 is often extended by a propeller shaft 15 of larger diameter. In supporting the propeller shaft 15, a hollow tubular extension having a bearing to support the propeller shaft near its end and a skirt portion on the other end has previously been used, with the skirt portion contacting the end face of the motor casing 1, fixed by means of screw, etc. In this case, however, sufficient mechanical strength for support cannot be obtained since the abovementioned hollow tubular extension is cantilever supported, fixed to the motor casing 1 only by the skirt portion. Moreover, the alignment of the axis of the extension is determined by the accuracy of the skirt portion and the end face of the motor casing 1, so that it is difficult to align the propeller shaft 15 and with the motor shaft 3.

On the other hand, the present invention has no problem in mechanical strength since a tubular extension 20 supporting the bearing 17 is constructed integrally with the cap mount 2. Accurate alignment of the propeller shaft 15 and the motor shaft 3 can be automatically provided by finishing with high precision the inner circumference of the cap mount 2 to be fitted onto the outer circumference of the motor casing 1 since the outer circumference of the motor casing 1 is generally finished with high precision.

As described above, vibration can be prevented by this invention since the motor is supported at its center of gravity. Also, positioning of the center of gravity can be easily performed because a cap mount is used.

Numerous changes may be made in the above described motor mount, and different embodiments of the present invention may be made without departing from the scope thereof. Therefore, it is intended that all matter contained in the foregoing description and in the accompanying drawings be interpreted as illustrative of the invention and not in a limiting sense.

What is claimed is:

1. A motor mount for an electric motor comprising a generally cylindrical body having an inner diameter substantially equal to the outer diameter of the motor casing to fixedly and telescopingly receive at least a portion of the motor casing therewithin and mounting members integral with the cylindrical body for permitting attachment of said cylindrical body to a supporting member, the mounting members being located at the longitudinal center of gravity of the combination of the motor and the mount.

2. A motor mount according to claim 1, further comprising adjusting means to longitudinally locate and fix the casing within the body so that the mounting members are located at the center of gravity of the combination.

3. A motor mount according to claim 1, in which the body is formed with a tubular extension carrying a bearing near one end thereof to support an extension of the motor shaft.

4. A motor mount according to claim 1, in which a propeller shaft carrying at one end a propeller is provided, the body being formed with a tubular extension carrying a bearing near one end thereof to rotatably support the propeller shaft, the other end of the propeller shaft being fixed to the motor shaft for rotation therewith, the mounting members being located at the longitudinal center of gravity of the combination of the body, motor, propeller shaft and propeller.

5. A motor mount according to claim 1, in which the body is formed with cooling holes.

* * * * *